United States Patent [19]

Rossier

[11] Patent Number: 4,731,975
[45] Date of Patent: Mar. 22, 1988

[54] MACHINE FOR AUTOMATICALLY POSITIONING PRODUCTS INTO RECEIVER ALVEOLI

[76] Inventor: Pierre Rossier, Chemin Neuf, Gironville, 91270 Maisse, France

[21] Appl. No.: 43,555

[22] PCT Filed: Jul. 24, 1986

[86] PCT No.: PCT/FR86/00262

§ 371 Date: Mar. 23, 1987

§ 102(e) Date: Mar. 23, 1987

[87] PCT Pub. No.: WO87/00504

PCT Pub. Date: Jan. 29, 1987

[30] Foreign Application Priority Data

Jul. 26, 1985 [FR] France ............................... 85/11579

[51] Int. Cl.⁴ ...................... B65B 5/10; B65B 19/34; B65B 35/44; B65B 35/56
[52] U.S. Cl. ........................................ 53/148; 53/537; 53/544; 53/236; 53/244; 53/247; 198/396
[58] Field of Search ................... 198/396, 455; 53/247, 53/148, 236, 244, 249, 251, 544, 537

[56] References Cited

U.S. PATENT DOCUMENTS

| | | | |
|---|---|---|---|
| 1,582,820 | 4/1926 | Hungerford | 198/396 |
| 2,781,885 | 2/1957 | Taylor | 198/396 X |
| 2,945,335 | 7/1960 | Nicolle . | |
| 2,955,698 | 10/1960 | Packman et al. . | |
| 2,983,088 | 5/1961 | Stoeckel et al. | 53/236 X |
| 3,016,665 | 1/1962 | Barrett . | |
| 3,119,217 | 1/1964 | Brownlee | 53/236 |
| 4,030,268 | 6/1977 | Payne | 53/55 |
| 4,376,481 | 3/1983 | Franklin | 198/396 X |

FOREIGN PATENT DOCUMENTS 1079174 8/1967 United Kingdom .

Primary Examiner—Horace M. Culver
Attorney, Agent, or Firm—Sandler & Greenblum

[57] ABSTRACT

A machine for automatically setting in place products into receiver alveoli comprises essentially an alignment device (10) for aligning the products (11), which device is designed to arrange the products in lines in a plurality of columns, a device (12) for depositing aligned products into the receiver alveoli (14) and a device (13) for transporting said alveoli. The deposition device comprises a dispenser member (17) comprising a feed pin wheel comprised of a drum (19) provided with pins (20) radially arranged at the periphery of said drum. A control mechanism comprising a drive wheel (24) fitted with a roller (23) drives the feed pin wheel via rollers (22) mounted on a disc (21) which is integral with the drum (19). The device for transporting the receiver alveoli (14) comprises essentially a chain (35) provided with levers (37) arranged to pivot about an axis (38) due to the existence of a guide (40) which cooperates with follower members (39) integral with the levers (37).

26 Claims, 5 Drawing Figures

MACHINE FOR AUTOMATICALLY POSITIONING PRODUCTS INTO RECEIVER ALVEOLI

The present invention relates to a machine for automatically positioning products, in particular food products, such as biscuits, petit fours or the like, in at least one layer, in receiver alveoli. This machine comprises at least one endless conveyor belt to transport the randomly positioned products, an alignment apparatus of these products, an apparatus for transport of the alveoli and an apparatus for depositing the products in the alveoli.

The problem of placing certain alimentary products particularly biscuits, petit fours, or the like, having irregular shapes, has not yet been resolved in a satisfactory manner. The alignment of the biscuits on a transport belt normally occurs in a manual fashion and the placement in a box, if it is not performed manually, occurs by means of a movable arm provided with suction grips. A manual intervention constitutes a major disadvantage because it occurs along a line where all the other operations can be automated. Recourse to a moveable arm utilizing suction grips considerably limits the production rate and cannot be applied to the manipulation of certain products.

The present invention proposes overcoming these disadvantages by providing an entirely automated machine to align and place into a box food products and particularly biscuits which can have a variety of irregular shapes. to this end, the machine for the automatic positioning of products, according to the invention, is characterized in that the alignment apparatus of the products comprises at least one flexible endless element, positioned parallel above the conveyor belt and driven in the opposite direction. This flexible endless element being equipped with at least one series of pins, aligned in the direction of their displacement and mounted in a manner so as to point towards the surface of the conveyor belt, the free ends of the pins being positioned at a distance from the surface of the conveyor belt less than the thickness of the transported products.

SUMMARY OF THE INVENTION

According to one preferred embodiment, the flexible endless element comprises one endless belt provided with at least one line of pins substantially perpendicular to its plane.

According to one preferred embodiment, the flexible endless element comprises at least two endless chains mounted parallel to one another and connected by transverse bars perpendicular to these chains, each of these bars being equipped with a series of pins positioned at regular intervals to form pin lines parallel to the chains, each pin being oriented towards the surface of the conveyor belt of the products.

In this embodiment, each pin preferably comprises means for adjustment adapted to allow for the adjustment of its height, its inclination with respect to the surface of the endless conveyor belt of the products and its distance with respect to the adjacent pins situated on the same transverse bar.

Each of the endless chains preferably comprises attachment emans adapted to adjust the spacing between the transverse bars.

The transport apparatus of the receptor alveoli preferably comprises at least one endless chain carrying a series of pivotable levers of which one end is journalled on the chain and whose other end carries a receptor alveolus. Each of the levers is equipped with a following element adapted to follow a guidance element and to cooperate with the follower element integral with each lever to assure a predetermined inclination of this lever. This follower element is preferably constituted by a slide of variable inclination.

The apparatus for depositing products in the receptor alveoli comprises preferably a distributor element adapted to pick up the products brought by the endless conveyor belt, a swivelling slide to direct the products of the distributor towards the alveoli, and control means for controlling the distributor element and the orientation of the slide.

The distributor element preferably comprises at least one pin wheel constituted by a drum provided with pins positioned radially to the peripheral surface of the drum, these pins being regularly spaced and their end being separated from the endless conveyor belt by a free space less than the thickness of the products conveyed.

The control means of the distributor preferably comprise a disk, provided along its periphery with at least one protruding element adapted to enter into contact with a complimentary element connected to the distributor element, and adapted to make the latter turn at least through an arc corresponding to the distance between two pins, this distance being substantially equal to the length of a transported product.

The pin wheel comprises as many complimentary elements as pins positioned on a single circle described on the peripheral surface of the drum.

The disk of the control means of the distributor element comprises as many protruding elements as alveoli receiving products.

The deposition means preferably comprise a central cam, a lever associated with this cam and the transfer slide of the products, this lever being supported on the cam to adjust the inclination of the slide with respect to the receptor alveoli as a function of the angular position of the cam.

The deposition means preferably comprise a shock absorption element of the products comprising at least one flexible ribbon, free at one of its ends and attached at its other end such that it hangs freely in each receptor alveolus when the latter is in its filling position.

BRIEF DESCRIPTION OF THE DRAWINGS

The present invention will be better understood with reference to the description of one embodiment and of the annexed drawing in which.

DETAILED DESCRIPTION OF PREFERRED EMBODIMENT

Figure 1:
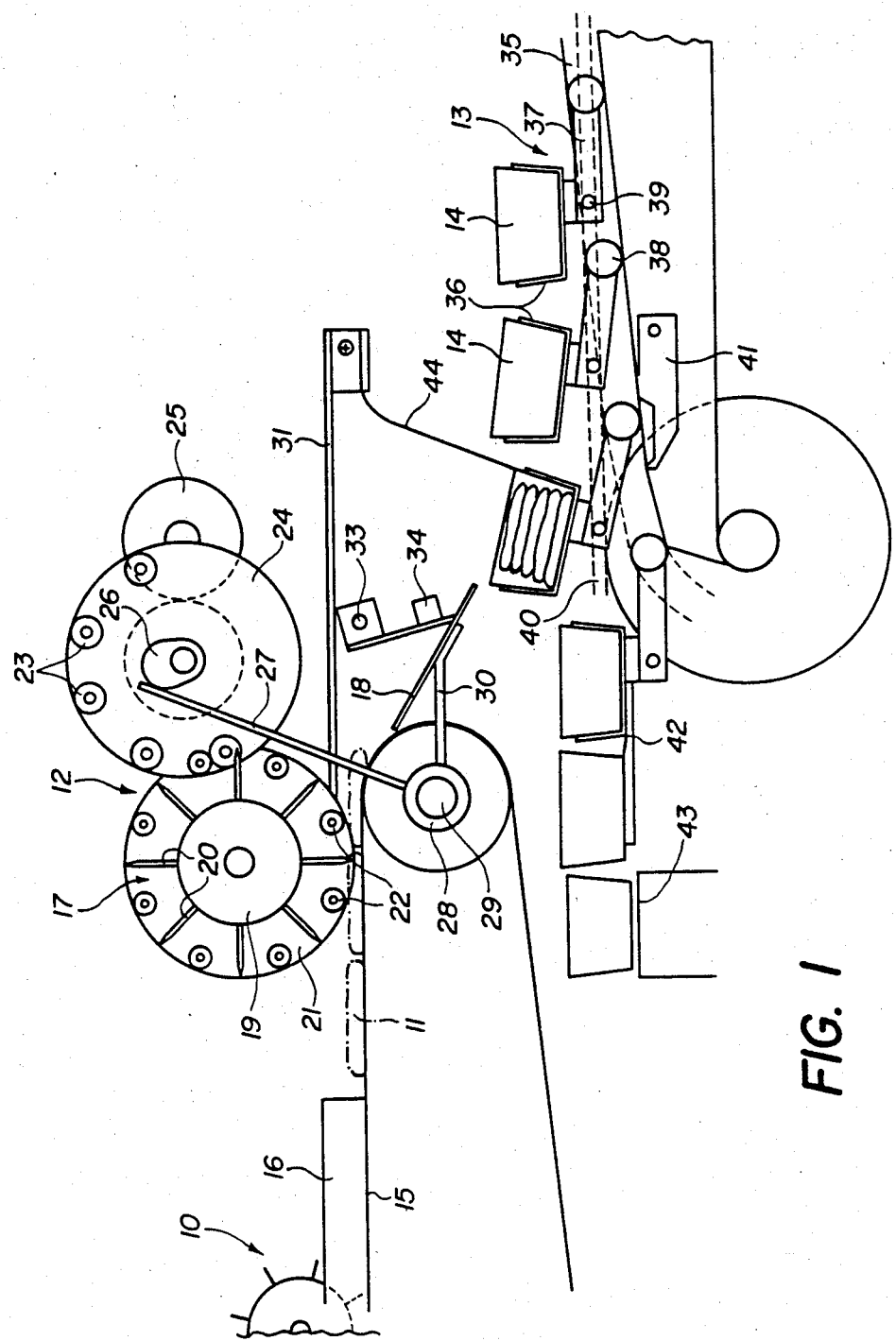
FIG. 1 shows a partial schematic view of the machine illustrating more particularly the deposition apparatus and the apparatus for transport of the alveoli.

The machine illustrated by FIG. 1 principally comprises an apparatus 10 for aligning products 11 adapted to arrange the products in a line in several columns, a deposition apparatus 12 of the aligned products and a transport apparatus 13 of the alveoli 14 adapted to contain the said products 11.

Figure 3:
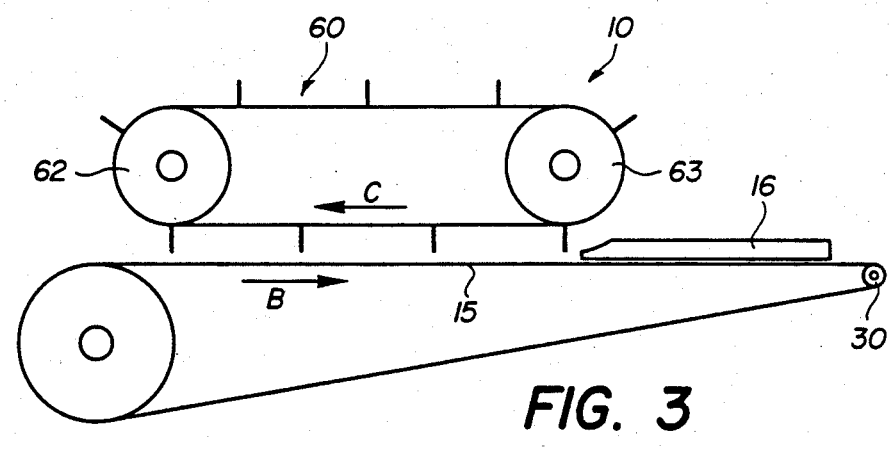
FIG. 3 shows a schematic elevational view of the alignment apparatus of the products.
Figure 4:
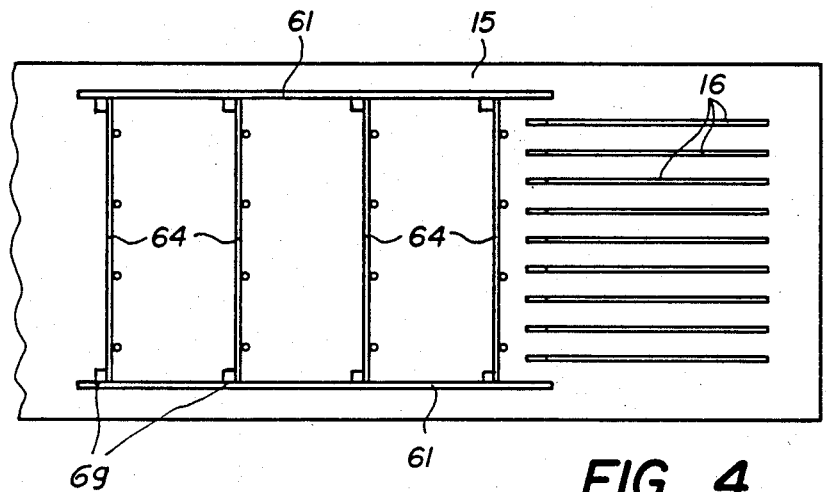
FIG. 4 illustrates a top view of this apparatus.
Figure 5:
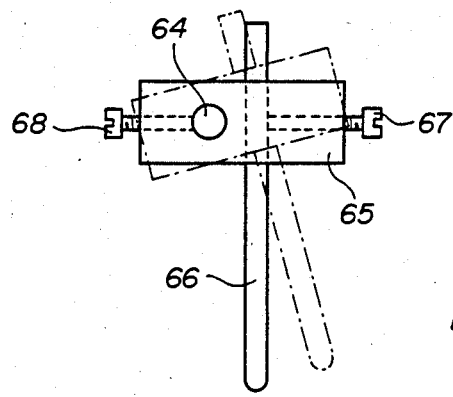
FIG. 5 illustrates a detailed view of the pins of the alignment apparatus.

The alignment apparatus 10, which will be described in greater detail with reference to FIGS. 3–5, is composed particularly of an endless conveyor belt 15, for example of the flexible belt type, continuously driven, and of a plurality of longitudinal fixed guides 16 (see FIG. 4). The fixed guides are adapted to channel products 11 and to transport them from a supply zone where they are randomly arranged, towards a take-up zone by the deposition apparatus 12, where they are arranged end-to-end in a plurality of columns parallel to one another.

In the example described, the products are driven by friction by the conveyor band 15, aligned with the aid of pins serving as a pusher and channeled by the fixed guides 16 which bring them to the vicinity of the deposition apparatus 12.

This deposition apparatus comprises essentially a distribution element 17 adapted to take up the products brought by the endless conveyor belt 15 and a slide 18 for transfer of the products adapted to direct the products of the distributor towards the receptor alveoli 14. The distribution element comprises at least one pin wheel, this wheel being constituted by a cylindrical drum 19 provided with pins 20 positioned radially to the periphery of this drum. Pins 20 are regularly spaced on several circular lines parallel to one another and outlined on the periphery of the drum. They are thus grouped in a plurality of series of which each corresponds to a guidance channel of the products defined by two longitudinally fixed guides 16 of alignment apparatus 10 (described below).

Pins 20 are responsible for pushing products 11 to slide 18 on which they slide directly into the receptor alveoli 14.

Drum 19 of distribution element 17 is associated with a disk 21 which carries a series of protruding elements, preferably rollers 22, mounted on one of the surfaces of this disk, and regularly spaced along the length of its periphery. The number of rollers 22 is equal to the number of pins of the same series. These rollers are adapted to cooperate with complimentary elements, preferably drive rollers 23 mounted on a drive disk 24, coupled to a drive wheel 25 of a motor (not shown). Rollers 23 are mounted on a surface of disk 24, along the length of its periphery, and their number is equal to the number of products adapted to be placed in a single receptor alveoli. In effect, each turn of disk 24 defining a turn of the machine corresponds to a step of the advancement mechanism of the receptor alveoli. In the example illustrated, disk 24 has five drive rollers 23. At each turn of disk 24, a drive roller takes up a roller 22 of disk 21, such that for a turn of the said disk 24, a total of five products are pushed by the pins of a single series and deposited in a receptor alveolus.

At the center of the drive disk 24 is mounted a cam 26 on which is supported a lever 27 integral with a socket 28 mounted on a fixed axis 29, and adapted to freely pivot around this axis. This socket 28 is integral with a second lever 30 which carries at its free end the slide 18 for transport of products 18. The return force due to the weight of slide 11 tends to make the socket pivot towards the right in the figure, which serves to maintain lever 27 resting against cam 26.

A comb 31 comprises a certain number of arms which extend between the parallel series of pins 20. It serves to eliminate the products which present themselves in the deposit zone and which are not aligned behind one another, particularly products which overlap. The comb is preferably pivotable to facilitate access to the components mounted below.

A flap 32 journalled on a fixed axis 33 and equipped with an adjustable weight 34, assures the braking of the products on the ramp constituted by slide 18 for transfer of the products. It can be mounted under comb 31.

The deposition apparatus, described above, is of very simple design and of particularly economic construction. The control mechanism of the distributor element can easily be transformed as required. The addition or removal of one or more rollers 23 makes it possible to increase or reduce by one or more the number of products deposited in each receptor alveolus. The shape of the cam makes it possible to orient in appropriate fashion the transfer slide of the product and to vary this orientation during filling of the alveoli, such that this filling occurs in the most appropriate fashion. If necessary, braking force of the products can be adjusted depending upon the mass of the counterweight 34 attached to flap 32.

The transport apparatus of the alveoli 14 essentially comprises an endless chain 35 driven in continuous or discontinuous rotation, in one direction or the other, along a trajectory defined by a rotation path along the length of which this chain moves. On each chain is mounted supports 36 which carry alveoli 14. These supports are attached to the free ends of levers 37, journalled at their other ends on axes 38 which constitute the axes of the links of chain 35. At their other free end, the levers carry a follower element 39 which is adapted to be supported on a guidance element 40. This guidance element defines the trajectory followed by the free ends of levers 37, while the trajectory of the other ends of these levers corresponding to the axes 38 of the links, is defined by the rotation path of the chain. By a relative appropriate arrangement of these two guidance elements, it is possible to adjust the inclination of the receptor alveoli such that the reception of the products is assured in the most appropriate fashion. By the interposition of a hollow or bump, at a predetermined location along the rotation path of the chain, it is possible to locally modify the inclination of the alveoli so as to assure the best positioning of the product. Such a hollow or bump can, for example, be formed by means of an adjustable lever 41. After their filling, the receptor alveoli 14 are deposited on a receptor plate 42 from which they are evacuated by an evacuation transporter belt 43.

To cushion the fall of the products in the alveoli and to guide them in the course of this fall, a flexible band 44 is suspended under comb 31 and hangs downwardly such that its free end is positioned at the bottom and along the length of the rear wall of the alveolus which receives the products. The flexible band can be made of cloth, fiberglass or any synthetic or natural fiber.

Figure 2:
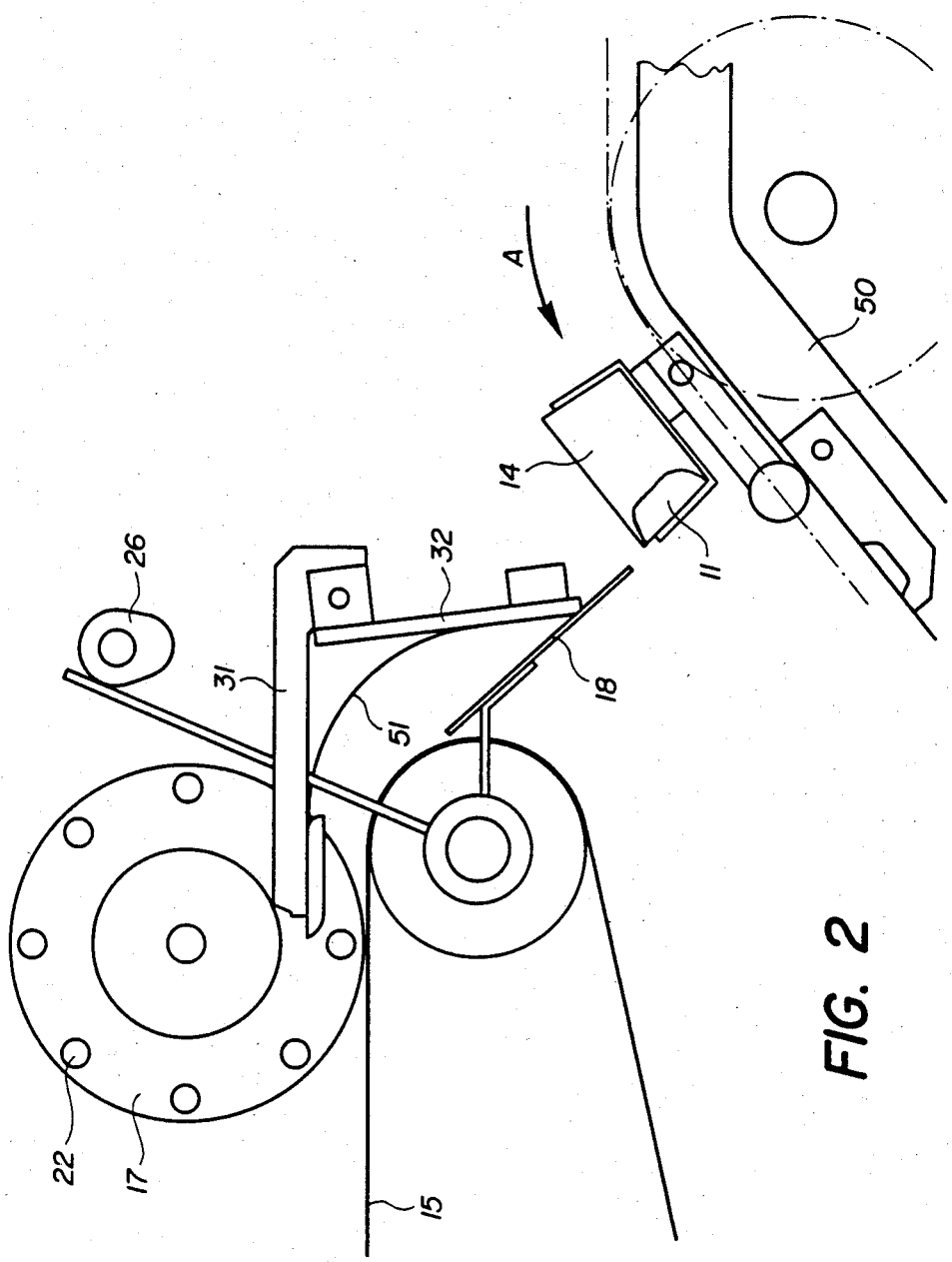
FIG. 2 illustrates a partial view of an alternative to the apparatus illustrated by FIG. 1.

The alternative embodiment shown in FIG. 2 shows a deposition apparatus substantially identical to that of FIG. 1. The deposition apparatus is associated with an apparatus for transporting receptor alveoli which is adapted to allow for the juxtaposed vertical positioning of products 11 in the receptor alveoli 14. As was previously explained, the principle of associating the rotation path of the transport chain of the alveoli receptors and of a guidance element of this chain allows great flexibility in providing these transport means of the alveoli. As is shown in the figure, alveoli 14 transported in the direction of the arrow A are displaced along the length of a ramp 50, and are presented under the transfer slide 18 of the products with an inclination which allows for the positioning of products 11 juxtaposed and standing on their ends.

To guide the products during their transfer on slide 18, the deposit apparatus comprises a deflector 51, mounted for example between comb 31 and flap 32.

The other components of this apparatus are identical to those shown by FIG. 1 and will not be described in greater detail in this text.

With reference to FIGS. 3-5, the alignment apparatus 10 is essentially composed of a pin chain 60 which comprises in fact two lateral chains 61 held parallel to each other by two pairs of pinions 62 and 63. Transverse bars 64 are mounted on these chains perpendicular to the direction of displacement of the products. The direction of displacement is defined by the arrow B indicating the direction of displacement of the conveyor belt 15. This direction is opposite to the direction of displacement of the pin chain 60, shown by arrow C.

The transverse bars 64 carry a series of pins comprising adjustable supports 65 each carrying a round or shaped shaft section 66. The shaft sections 66 can be adjusted in height and blocked into position by means of a blockage screw 67. The adjustable supports 65 can be positioned along the length of the transverse bars 64 and attached in the selected position by means of a second blockage screw 68. This means particularly makes it possible to select the number of pins per transverse bar, to determine the spacing between the pins depending upon the nature and dimensions of the products to be aligned and likewise to adjust the inclination of these pins as shown in the figure in dashed lines. Furthermore, the transverse bars are attached to chains 61 by attachment means 69, adapted to adjust the spacing of bars 64 with respect to one another.

The products are moved by friction by the conveyor belt 15. The pin chain 60 acts as a comb traversing the mass of products deposited randomly and combs these products in a manner so as to align them to form columns which will thereafter be channeled between guides 16.

The present invention is not limited to the embodiments described but can undergo various modifications and present itself in various alternatives obvious to one with skill in the art. In the example described, the transport apparatus of the alveoli circulates along a direction substantially parallel to the direction of displacement of the products on the conveyor belt. However, to package certain products it may be desirable to displace the transport chain of the receptor alveoli along a direction perpendicular to the direction of displacement of the products. Furthermore, the transport apparatus of the alveoli comprises a chain 35 and a guidance element 40 of elongated form can be replaced by a transport apparatus where the journal axes 38 of the levers are mounted on a disk and/or the guidance element has a more or less circular shape.

What is claimed is:

1. A machine for automatically positioning randomly positioned products, in at least one layer in receptor alveoli, said machine comprising at least one endless conveyor belt having a surface for transporting said randomly positioned products in one direction, alignment means for aligning said products, means for transporting said alveoli, deposit means for depositing said products in said alveoli, said alignment means comprising at least one flexible endless element positioned parallel above said endless conveyor belt and driven in a direction of displacement reverse to said one direction, said flexible endless element being equipped with at least one series of pins having free ends aligned in said direction of displacement and mounted such that said free ends generally point towards the surface of said endless conveyor belt, said free ends of said pins being spaced from said surface of said endless conveyor belt by a distance less than a thickness of said transported products.

2. The machine according to claim 1, wherein said flexible endless element comprises an endless belt provided with at least one line of pins substantially perpendicular to a plane parallel to a surface of said endless belt.

3. The machine according to claim 1, wherein said flexible endless element comprises at least two endless chains mounted parallel to one another and connected by transverse bars spaced from each other and positioned perpendicular to said chains, each of said bars being equipped with a series of pins, said pins positioned adjacent to each other and spaced at regular intervals to form pin lines parallel to said chains, each pin being directed towards the surface of said endless conveyor belt.

4. The machine according to claim 3, wherein each pin comprises adjustment means, for adjusting the height of each pin, its inclination with respect to said surface of said conveyor belt and its spacing from adjacent pins of said same transverse bar.

5. The machine according to claim 3, wherein each chain comprises attachment means adapted to adjust said spacing between said transverse bars.

6. The machine according to claim 1, wherein said means for transporting said alveoli comprises at least one endless chain carrying a series of pivotable levers each lever having two ends, one end journalled on said chain and the other end being adapted to carry at least one receptor alveolus, each lever being equipped with at least one follower element adapted to follow a guidance element and adapted to cooperate with the follower element, each said follower element being integral with each respesctive lever to assure a predetermined inclination of said lever.

7. The machine according to claim 6, wherein said guidance element comprises a slide having variable inclination.

8. The machine according to claim 1, wherein said deposit means comprises:
(a) a distributor element for distributing said products from said endless conveyor belt (15),
(b) a swivelling transfer slide, adapted to direct the products of the distributor element towards said alveoli, and
(c) control means to control said distributor element and said swivelling of said slide.

9. The machine according to claim 8, wherein said distributor element comprises at least one pin wheel comprising a drum having a peripheral surface and provided with pins positioned radially to said peripheral surface of said drum, said pins being regularly spaced and having a free end spaced from said conveyor belt by a distance less than a thickness of said products.

10. The machine according to claim 8, wherein said control means of the distributor element comprises a disk provided along the length of its periphery with at least one protruding element adapted to contact a complimentary element connected to said distributor element, and adapted to turn said distributor element through at least an arc corresponding to the distance between adjacent pins, said distance being substantially equal to the length of a transported product.

11. The machine according to claim 9, wherein said at least one pin wheel comprises a complementary element for each said pin positioned on a circle described on said peripheral surface of said drum.

12. The machine according to claim 10, characterized in that said disk comprises a protruding element for each product to be deposited into said alveoli.

13. The machine according to claim 1, wherein said deposit means comprises a central cam and a lever associated with said cam and with a slide for transfer of products, said lever being supported on said cam, said lever comprising means for adjusting the inclination of said slide with respect to said receptor alveoli wherein said adjustment means comprises means for changing the angular positio of the cam.

14. The machine according to claim 1, wherein said deposit means comprises a cushioning element of said products, said cushioning element comprising at least one flexible ribbon free at one end and attached at its other end, wherein said ribbon hangs freely in each receptor alveoli when said alveoli is positioned to receive said products.

15. The machine according to claim 1 comprising positioning means positioned on said conveyor belt for channelling products and arranging them in columns.

16. The machine according to claim 15 wherein said positioning means comprises a longitudinal fixed guide.

17. The machine according to claim 8 comprising a flap journalled on a fixed axis and comprising an adjustable weight for braking distribution of said products on said slide.

18. A machine for automatically positioning products in a receptor alveoli, said machine comprising at least one endless conveyor belt for transporting said products, means for aligning said products on said endless conveyor belt, means for transporting said alveoli, means for depositing said products in said alveoli, said depositing means comprising a distribution element for distributing said products into said alveoli, controlling means for controlling said distribution element, said distribution element comprising a rotatable drum having a peripheral surface and provided with radially positioned spaced apart pins, each pin having a free end spaced from said conveyor belt by a distance less than a thickness of said products, said drum further comprising a series of elements, one element corresponding to each of said spaced apart pins, each element cooperating with a series of elements positioned on said controlling means, each rotation of said drum filling one receptor alveoli.

19. The machine according to claim 18 wherein said endless conveyor belt and said means for aligning are driven in opposite directions.

20. The machine according to claim 18 wherein said means for aligning is positioned parallel above said endless conveyor belt.

21. The machine according to claim 20 wherein said aligning means comprise at least one flexible endless element and a series of pins positioned on said flexible endless element.

22. The machine according to claim 21 wherein said flexible endless element comprises at least two endless chains, each chain mounted parallel to each other and connected by transverse bars spaced from each other and positioned perpendicular to said chains.

23. The machine according to claim 22 wherein said series of pins is positioned on said transverse bars.

24. The machine according to claim 23 wherein each pin of said series of pins comprises adjustment means for adjusting the height of said pins and inclination with respect to said endless conveyor belt and the spacing between adjacent pins.

25. The machine according to claim 18 comprising positioning means positioned on said endless conveyor belt for channeling products and arranging them in columns.

26. The machine according to claim 25 wherein said positioning means comprises at least two longitudinal fixed guides.

* * * * *

UNITED STATES PATENT AND TRADEMARK OFFICE
CERTIFICATE OF CORRECTION

PATENT NO. : 4,731,975

DATED : March 22, 1988

INVENTOR(S) : Pierre ROSSIER

It is certified that error appears in the above-identified patent and that said Letters Patent is hereby corrected as shown below:

```
        At column 1, line 21, change "movable" to ---
moveable---.
        At column 1, line 32, change "to this end," to
---To this end,---.
        At column 1, line 65, change "emaus" to ---
means---.
        At column 3, line 63, change "11" to ---18---.
        At column 3, line 62, change "18" to ---11---.
        At column 6, line 44, change "respesctive" to
---respective---.
        At column 7, line 20, change "positio" to ---
position---.
```

Signed and Sealed this

Twentieth Day of September, 1988

*Attest:*

DONALD J. QUIGG

*Attesting Officer*  *Commissioner of Patents and Trademarks*